US011885240B2

(12) United States Patent
Berdowski et al.

(10) Patent No.: US 11,885,240 B2
(45) Date of Patent: Jan. 30, 2024

(54) GAS TURBINE ENGINE WITH FLUID CIRCUIT AND EJECTOR

(71) Applicants: General Electric Company Polska sp. z o.o., Warsaw (PL); General Electric Deutschland Holding GmbH, Frankfurt (DE)

(72) Inventors: Tomasz Edward Berdowski, Warsaw (PL); Mirosław Sobaniec, Warsaw (PL); Maciej Czerwiński, Warsaw (PL); Ashish Sharma, Garching (DE); Piotr Jerzy Kuliński, Warsaw (PL)

(73) Assignees: General Electric Company Polska sp.z o.o, Warsaw (PL); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 17/380,139

(22) Filed: Jul. 20, 2021

(65) Prior Publication Data

US 2022/0372885 A1 Nov. 24, 2022

(30) Foreign Application Priority Data

May 24, 2021 (PL) ........................................ 437947

(51) Int. Cl.

*F01D 9/04* (2006.01)
*F01D 25/26* (2006.01)
*F01D 9/06* (2006.01)

(52) U.S. Cl.

CPC ............. *F01D 9/041* (2013.01); *F01D 9/065* (2013.01); *F01D 25/26* (2013.01); *F05D 2240/128* (2013.01); *F05D 2250/185* (2013.01); *F05D 2250/323* (2013.01); *F05D 2250/324* (2013.01); *F05D 2260/232* (2013.01); *F05D 2260/601* (2013.01)

(58) Field of Classification Search

CPC ... F01D 9/02; F01D 9/04; F01D 9/041; F01D 9/042; F01D 9/06; F01D 9/065; F01D 25/12; F01D 25/26; F05D 2240/128; F05D 2250/185; F05D 2250/323; F05D 2250/324; F05D 2260/232; F05D 2260/601

See application file for complete search history.

(56) References Cited

U.S. PATENT DOCUMENTS 4,317,646 A 3/1982 Steel et al.
5,123,242 A 6/1992 Miller
5,498,126 A * 3/1996 Pighetti ................... F01D 9/065 415/115

(Continued)

FOREIGN PATENT DOCUMENTS

CN 109229337 A 1/2019

*Primary Examiner* — Elton K Wong
(74) *Attorney, Agent, or Firm* — Dority & Manning, P.A.

(57) ABSTRACT

A gas turbine engine is provided having a static structure including a flowpath wall. A fluid circuit is extended through the flowpath wall and includes a first inlet opening in fluid communication with a first cavity to receive a first flow of fluid through the fluid circuit. The static structure includes an ejector positioned at the fluid circuit, in which the ejector includes a second inlet opening in fluid communication with a second cavity to receive a second flow of fluid through the ejector and into the fluid circuit.

20 Claims, 14 Drawing Sheets

(56) References Cited

U.S. PATENT DOCUMENTS

| | | | | |
|---|---|---|---|---|
| 6,241,467 | B1 * | 6/2001 | Zelesky | F01D 9/04 415/115 |
| 6,412,270 | B1 * | 7/2002 | Mortzheim | F01D 25/12 60/782 |
| 7,597,537 | B2 | 10/2009 | Bucaro et al. | |
| 7,785,072 | B1 * | 8/2010 | Liang | F01D 9/041 416/97 R |
| 7,837,429 | B2 | 11/2010 | Zhang et al. | |
| 8,652,602 | B1 | 2/2014 | Dolla | |
| 9,097,134 | B2 | 8/2015 | Ferch et al. | |
| 9,151,226 | B2 | 10/2015 | Zimmermann et al. | |
| 9,435,224 | B2 | 9/2016 | Raison et al. | |
| 9,534,505 | B2 | 1/2017 | Lucas | |
| 10,443,445 | B2 | 10/2019 | Liebl et al. | |
| 10,533,747 | B2 | 1/2020 | Corsmeier et al. | |
| 10,583,933 | B2 | 3/2020 | Elbibary et al. | |
| 10,914,187 | B2 | 2/2021 | Eastwood et al. | |
| 2009/0081029 | A1 * | 3/2009 | Dalton | F01D 5/187 415/178 |
| 2012/0003086 | A1 * | 1/2012 | Morris | F01D 25/28 415/200 |
| 2013/0170966 | A1 | 7/2013 | Cook | |
| 2016/0376897 | A1 * | 12/2016 | Spangler | F01D 5/02 415/177 |
| 2016/0377091 | A1 | 12/2016 | Cortequisse | |
| 2017/0114667 | A1 | 4/2017 | Sabo et al. | |
| 2017/0211416 | A1 * | 7/2017 | Weaver | F01D 25/12 |
| 2018/0038654 | A1 | 2/2018 | Popp et al. | |
| 2018/0245471 | A1 | 8/2018 | Eriksson et al. | |
| 2018/0245472 | A1 * | 8/2018 | Spangler | F01D 9/065 |
| 2018/0291747 | A1 * | 10/2018 | Pitt | F02C 7/18 |
| 2018/0347468 | A1 | 12/2018 | Caimano et al. | |
| 2019/0271237 | A1 | 9/2019 | Martin et al. | |
| 2019/0379257 | A1 | 12/2019 | Gerstler et al. | |
| 2020/0025304 | A1 | 1/2020 | Minta et al. | |
| 2020/0141654 | A1 | 5/2020 | Ranjan | |
| 2020/0300115 | A1 | 9/2020 | Aurahs et al. | |
| 2021/0001990 | A1 | 1/2021 | Garcia Zuazo et al. | |

* cited by examiner

GAS TURBINE ENGINE WITH FLUID CIRCUIT AND EJECTOR

GOVERNMENT SPONSORED RESEARCH

The project leading to this application has received funding from the European Union Clean Sky 2 research and innovation program under grant agreement No. CS2-ENG-GAM-2014-2015-01.

FIELD

The present subject matter relates generally to cooling structures for gas turbine engines.

BACKGROUND

Gas turbine engines produce high-temperature gases that flow in thermal contact with components through a gas flowpath. The high-temperature gases wear and degrade the gas turbine engine components, and at times the high-temperature gases may exceed the melting point or other critical temperatures of some components at the gas flowpath. Gas turbine engines generally include cooling circuits and structures to reduce component temperatures to mitigate wear and deterioration from the high-temperature gases.

Such cooling circuits generally remove relatively cool air from the compressors and direct the air to other components, such as combustor and turbine section components, to provide the desired cooling. Utilizing compressed air, and particularly the high-pressure, high-energy compressed air from the compressor section, removes and bypasses input energy that would otherwise go toward the combustion process and instead utilizes the compressed air for cooling purposes. Accordingly, such methods and structures for cooling penalize thermodynamic performance and efficiency of the engine for structural durability and component life.

As such, there is a need for improved cooling structures for gas turbine engines. Furthermore, there is a need for improved structures for cooling that reduce penalties associated with utilizing relatively high-pressure air.

BRIEF DESCRIPTION

Aspects and advantages of the disclosure will be set forth in part in the following description, or may be obvious from the description, or may be learned through practice of the disclosure.

An aspect of the disclosure is directed to a gas turbine engine having a vane assembly including a flowpath wall. A fluid circuit is extended through the flowpath wall. The fluid circuit defines a first inlet opening in fluid communication with a first cavity to receive a first flow of fluid through the fluid circuit. The vane assembly includes an ejector positioned at the fluid circuit. The ejector defines a second inlet opening in fluid communication with a second cavity to receive a second flow of fluid through the ejector and into the fluid circuit.

Another aspect of the present disclosure is directed to a static structure for a gas turbine engine. The static structure includes a flowpath wall having a fluid circuit is extended through the flowpath wall. The fluid circuit includes a first inlet opening in fluid communication with a first cavity to receive a first flow of fluid through the fluid circuit. The static structure includes an ejector positioned at the fluid circuit. The ejector includes a second inlet opening in fluid communication with a second cavity to receive a second flow of fluid through the ejector and into the fluid circuit.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
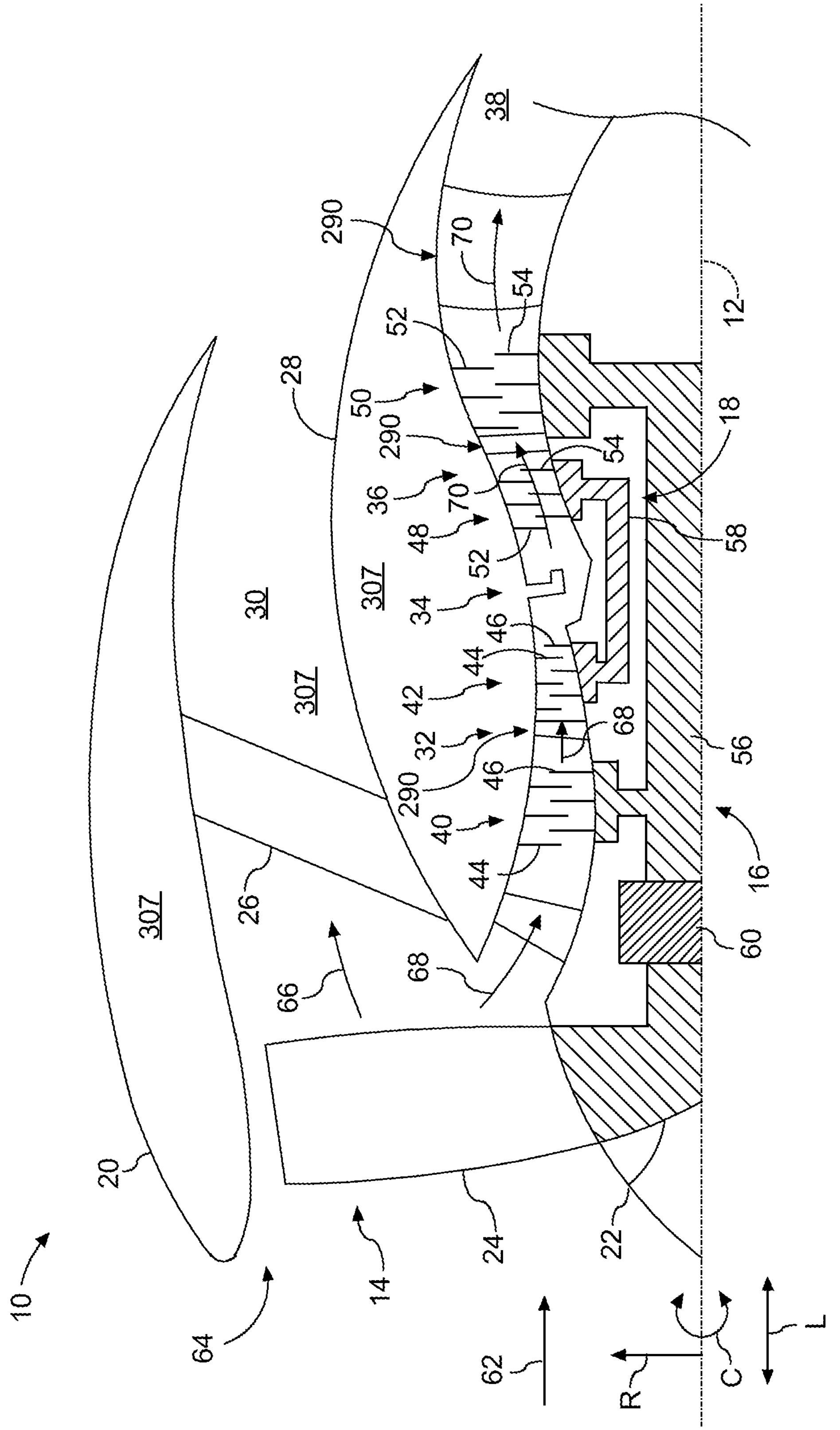
FIG. 1 is a schematic embodiment of an exemplary engine in accordance with aspects of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The singular forms "a", "an", and "the" include plural references unless the context clearly dictates otherwise.

Embodiments of cooling structures for gas turbine engines are provided herein that may reduce penalties associated with utilizing relatively high-pressure air. Structures and methods depicted and described herein include a gas turbine engine having a fluid circuit with an ejector formed in the fluid circuit. The ejector is formed with a static structure, such as a casing, a frame, or a vane assembly, or particularly with a vane assembly at an inner band, an outer band, or within an airfoil structure. The fluid circuit has a first inlet opening in fluid communication with a relatively low-pressure first cavity and a second inlet opening at the ejector in fluid communication with a relatively high-pressure second cavity. The ejector entrains or pulls the low-pressure flow of fluid into the fluid circuit from the first cavity via the relatively high-pressure flow of fluid from the second cavity. The first cavity may include an under-cowl area, fan casing, bypass flowpath, or other cavity having a large flow of low-pressure air (e.g., atmospheric pressure). The second cavity may include a cooling circuit, such as a secondary cooling circuit outside of a primary compressed air or combustion gas flowpath. In such a manner, it will be appreciated that as used herein, the term "cavity" refers broadly to any source of air and does not necessarily require a complete or substantially complete enclosure.

The ejector allows for relatively large magnitudes of low-temperature air to be pulled through the fluid circuit by relatively small magnitudes of relatively high-temperature air, such as from a compressor section, in contrast to all or substantially all of the cooling air coming from the compressor section.

Embodiments of the gas turbine engine with the fluid circuit and ejector depicted and described herein allow for improved cooling or thermal attenuation while reducing a quantity or magnitude of air from the compressor section and removed from the combustion process. As such, embodiments herein allow for improved engine and combustion efficiency while maintaining or improving cooling over conventional cooling structures.

Referring now to the drawings, FIG. 1 is a schematic cross-sectional view of one embodiment of a gas turbine engine 10. In the illustrated embodiment, the engine 10 is configured as a turbofan engine. However, in alternative embodiments, the engine 10 may be configured as a propfan or open rotor engine, a turbojet engine, a turboprop engine, a turboshaft gas turbine engine, or any other suitable type of gas turbine engine.

As shown in FIG. 1, the engine 10 defines a longitudinal direction L, a radial direction R, and a circumferential direction C. In general, the longitudinal direction L extends parallel to a longitudinal centerline 12 of the engine 10, the radial direction R extends orthogonally outward from the longitudinal centerline 12, and the circumferential direction C extends generally concentrically around the longitudinal centerline 12.

In general, the engine 10 includes a fan section 14, a low-pressure (LP) spool 16, and a high pressure (HP) spool 18 at least partially encased by an annular nacelle 20. More specifically, the fan section 14 may include a fan rotor 22 and a plurality of fan blades 24 (one is shown) coupled to the fan rotor 22. In this respect, the fan blades 24 are spaced apart from each other along the circumferential direction C and extend outward from the fan rotor 22 along the radial direction R. Moreover, the LP and HP spools 16, 18 are positioned downstream from the fan section 14 along the longitudinal centerline 12 (i.e., in the longitudinal direction L). As shown, the LP spool 16 is rotatably coupled to the fan rotor 22, thereby permitting the LP spool 16 to rotate the fan section 14. Additionally, a plurality of outlet guide vanes or struts 26 spaced apart from each other in the circumferential direction C extend between an outer casing 28 surrounding the LP and HP spools 16, 18 and the nacelle 20 along the radial direction R. As such, the struts 26 support the nacelle 20 relative to the outer casing 28 such that the outer casing 28 and the nacelle 20 define a bypass airflow passage 30 positioned therebetween.

The outer casing 28 generally surrounds or encases, in serial flow order, a compressor section 32, a combustion section 34, a turbine section 36, and an exhaust section 38. For example, in some embodiments, the compressor section 32 may include a low-pressure (LP) compressor 40 of the LP spool 16 and a high-pressure (HP) compressor 42 of the HP spool 18 positioned downstream from the LP compressor 40 along the longitudinal centerline 12. Each compressor 40, 42 may, in turn, include one or more rows of stator vanes 44 interdigitated with one or more rows of compressor rotor blades 46. Moreover, in some embodiments, the turbine section 36 includes a high-pressure (HP) turbine 48 of the HP spool 18 and a low-pressure (LP) turbine 50 of the LP spool 16 positioned downstream from the HP turbine 48 along the longitudinal centerline 12. Each turbine 48, 50 may, in turn, include one or more rows of stator vanes interdigitated with one or more rows of turbine rotor blades 54. In a particular embodiment, the turbine section includes a first stator vane assembly or turbine nozzle 52 positioned downstream of a combustion chamber 106 and upstream of the turbine rotor blades 54.

Additionally, the LP spool 16 includes the low-pressure (LP) shaft 56 and the HP spool 18 includes a high pressure (HP) shaft 58 positioned concentrically around the LP shaft 56. In such embodiments, the HP shaft 58 rotatably couples the rotor blades 54 of the HP turbine 48 and the rotor blades 46 of the HP compressor 42 such that rotation of the HP turbine rotor blades 54 rotatably drives HP compressor rotor blades 46. As shown, the LP shaft 56 is directly coupled to the rotor blades 54 of the LP turbine 50 and the rotor blades 46 of the LP compressor 40. Furthermore, the LP shaft 56 is coupled to the fan section 14 via a gearbox 60. In this respect, the rotation of the LP turbine rotor blades 54 rotatably drives the LP compressor rotor blades 46 and the fan blades 24.

In several embodiments, the engine 10 may generate thrust to propel an aircraft. More specifically, during operation, air 62 enters an inlet portion 64 of the engine 10. The fan section 14 supplies a first portion (indicated by arrow 66) of the air 62 to the bypass airflow passage 30 and a second portion (indicated by arrow 68) of the air 62 to the compressor section 32. The second portion 68 of the air 62 first flows through the LP compressor 40 in which the rotor blades 46 therein progressively compress the second portion 68 of the air 62. Next, the second portion 68 of the air 62 flows through the HP compressor 42 in which the rotor blades 46 therein continue progressively compressing the second portion 68 of the air 62. The compressed second portion 68 of the air 62 is subsequently delivered to the combustion section 34. In the combustion section 34, the second portion 68 of the air 62 mixes with fuel and burns to generate high-temperature and high-pressure combustion gases 70. Thereafter, the combustion gases 70 flow through the HP turbine 48 which the HP turbine rotor blades 54 extract a first portion of kinetic and/or thermal energy therefrom. This energy extraction rotates the HP shaft 58, thereby driving the HP compressor 42. The combustion gases 70 then flow through the LP turbine 50 in which the LP turbine rotor blades 54 extract a second portion of kinetic and/or thermal energy therefrom. This energy extraction rotates the LP shaft 56, thereby driving the LP compressor 40 and the fan section 14 via the gearbox 60. The combustion gases 70 then exit the engine 10 through the exhaust section 38.

The configuration of the gas turbine engine 10 described above and shown in FIG. 1 is provided only to place the present subject matter in an exemplary field of use. Thus, the present subject matter may be readily adaptable to any manner of gas turbine engine configuration, including other types of aviation-based gas turbine engines, marine-based gas turbine engines, and/or land-based/industrial gas turbine engines.

Figure 2:
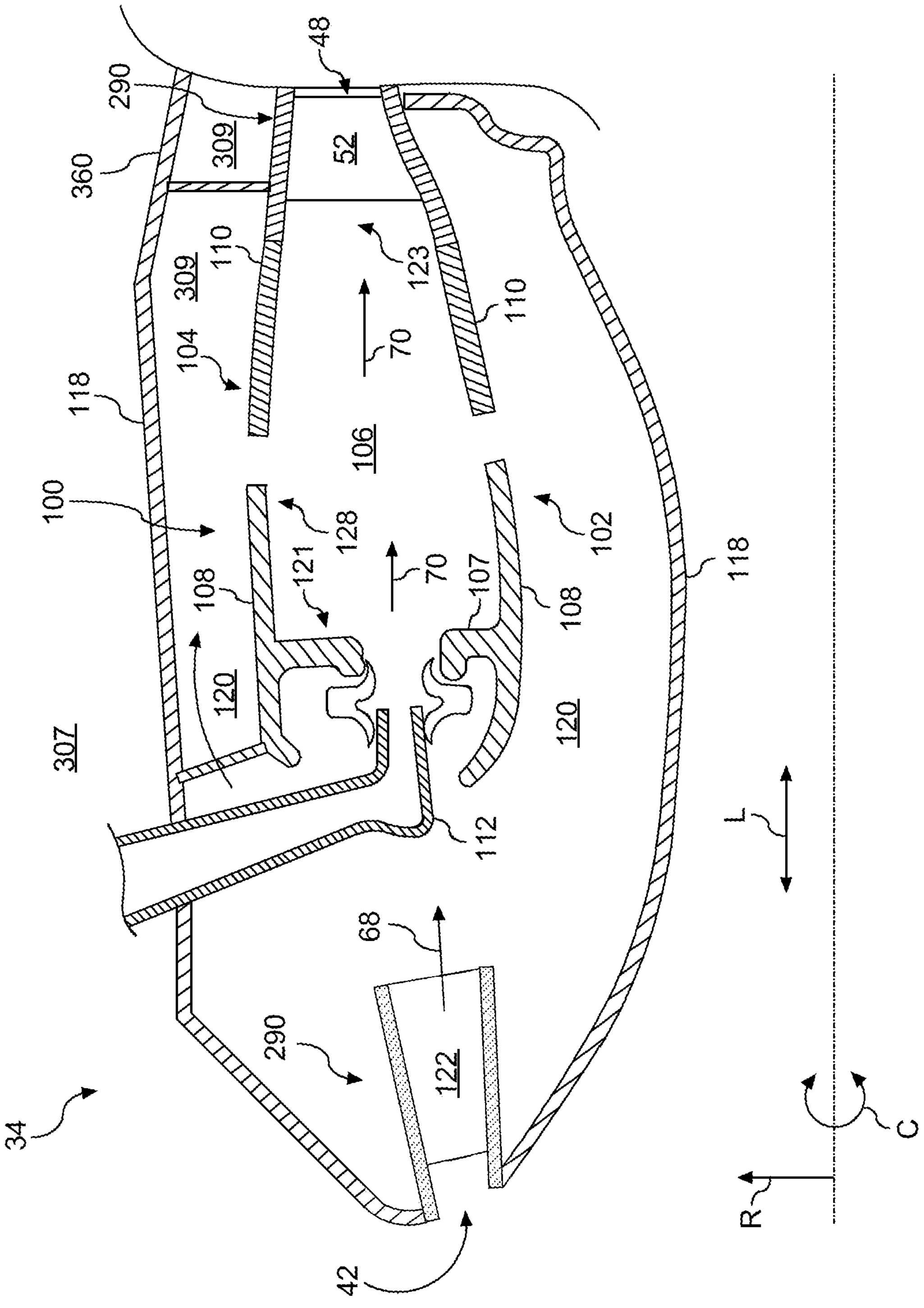
FIG. 2 is a schematic embodiment of an exemplary combustion section for an engine in accordance with aspects of the present disclosure.

FIG. 2 is a cross-sectional view of one embodiment of the combustion section 34 of the gas turbine engine 10. As shown, the combustion section 34 includes an annular combustor assembly 100 having a plurality of fuel nozzles 112 (although only one is shown in the view of FIG. 2). In several embodiments, the combustion section 34 includes a compressor discharge casing 118. In such embodiments, the compressor discharge casing 118 at least partially surrounds or otherwise encloses the combustor assembly 100 in the circumferential direction C. In this respect, a compressor discharge plenum 120 is defined between the compressor discharge casing 118 and liners 102, 104. The compressor discharge plenum 120 is, in turn, configured to supply compressed air to the combustor assembly 100. Specifically, as shown, the air 68 exiting the HP compressor 42 is directed into the compressor discharge plenum 120 by an inlet guide vane 122. The air 68 within the compressor discharge plenum 120 is then supplied to the combustion chamber(s) 106 of the combustor assembly 100 by the fuel nozzle(s) 112 for use in combusting the fuel.

The combustor assembly 100 includes an inner liner 102 extended annularly along the circumferential direction C. The combustor assembly 100 further includes an outer liner 104 positioned outward from the inner liner 102 along the radial direction R. The outer liner 104 is extended annularly along the circumferential direction C. In this respect, the inner and outer liners 102, 104 define the combustion chamber 106 therebetween. Each liner 102, 104 includes a first liner or forward liner segment 108 and a second liner or aft liner segment 110 positioned downstream of the forward liner segment 108 relative to the direction of flow of fluid, such as the flow of the combustion gases 70, through the combustor assembly 100. The combustor assembly 100 includes the fuel nozzles 112 extended through a bulkhead assembly 107 providing a wall at an upstream end 121 of the combustion chamber 106. Each fuel nozzle 112 supplies a mixture of gaseous and/or liquid fuel and oxidizer, such as air 68, to the combustion chamber 106. The fuel and air mixture burns within the combustion chamber 106 to generate the combustion gases 70. Although FIG. 2 illustrates a single annular combustor assembly 100, the combustion section 34 may, in other embodiments, include a plurality of combustor assemblies 100. Other combustor assembly configurations include can-combustors and can-annular combustors. Still other combustor assembly configurations include trapped vortex combustors, detonative-type combustors, or combinations of one or more types described herein.

Referring to FIGS. 1-2, the engine 10 includes one or more static structures 290 defining casings or frames of the engine 10. The static structure 290 is generally positioned upstream or downstream of a rotor assembly and may provide structural support for a bearing assembly, a lubricant system, a gearbox assembly, or for a driveshaft at the LP spool and/or HP spool. In various embodiments, the static structure 290 is positioned at the compressor section 32, at the combustion section 34, or at the turbine section 36, such as further described herein.

Figure 3:
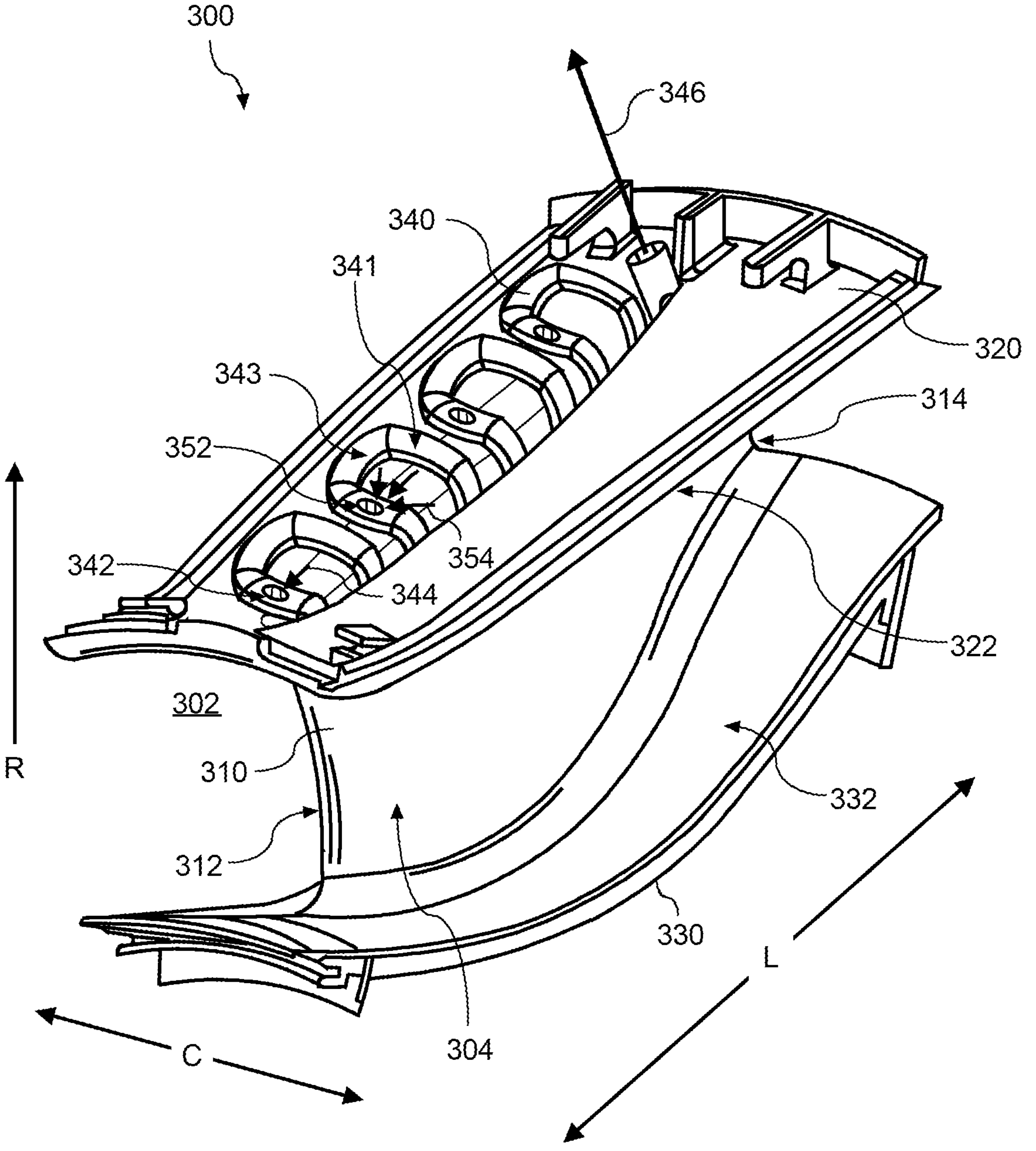
FIG. 3 is a perspective view of a portion of a static structure with a fluid circuit in accordance with aspects of the present disclosure.
Figure 4:
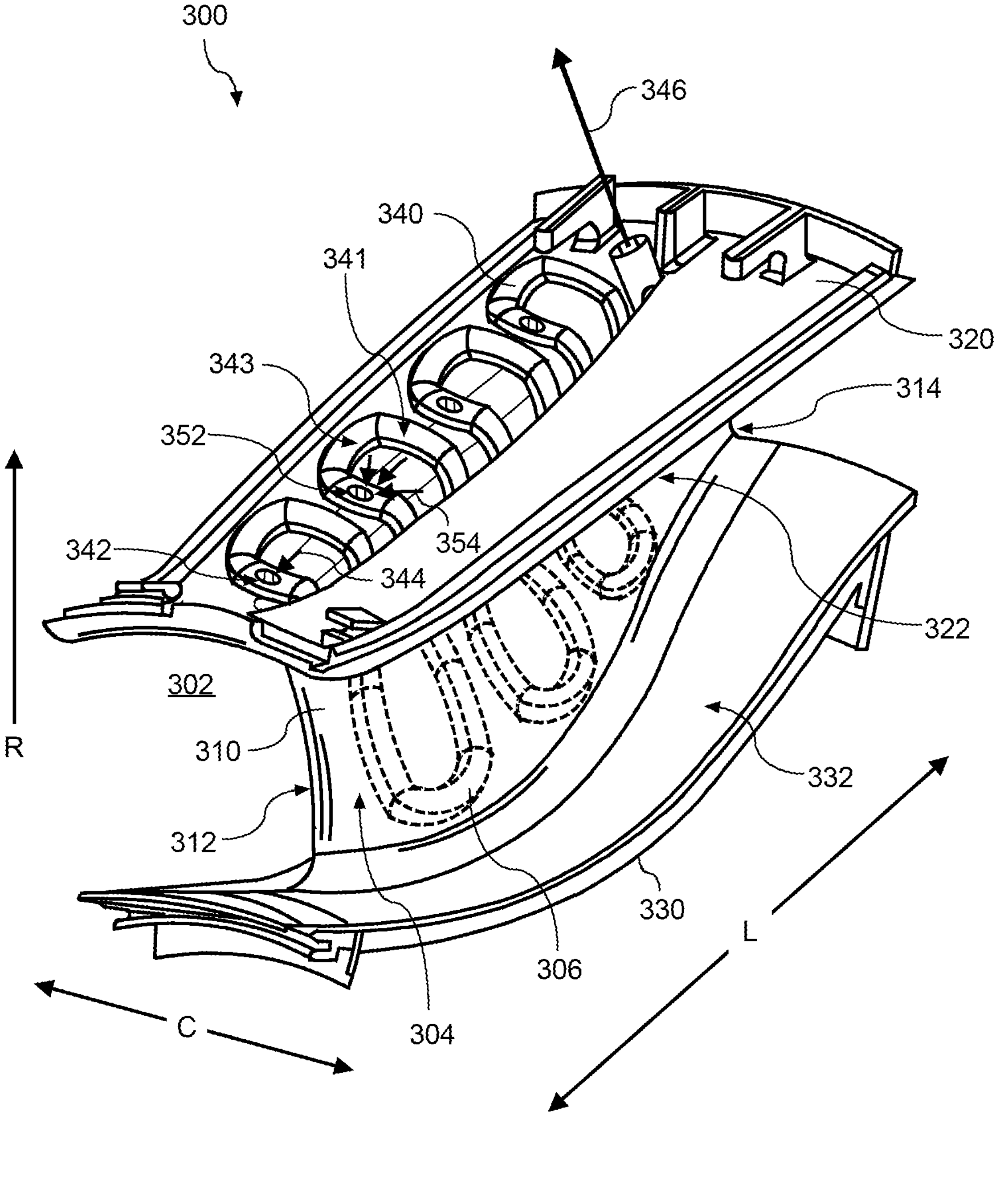
FIG. 4 is a perspective view of an embodiment of a portion of a static structure with a fluid circuit in accordance with aspects of the present disclosure.
Figure 5:
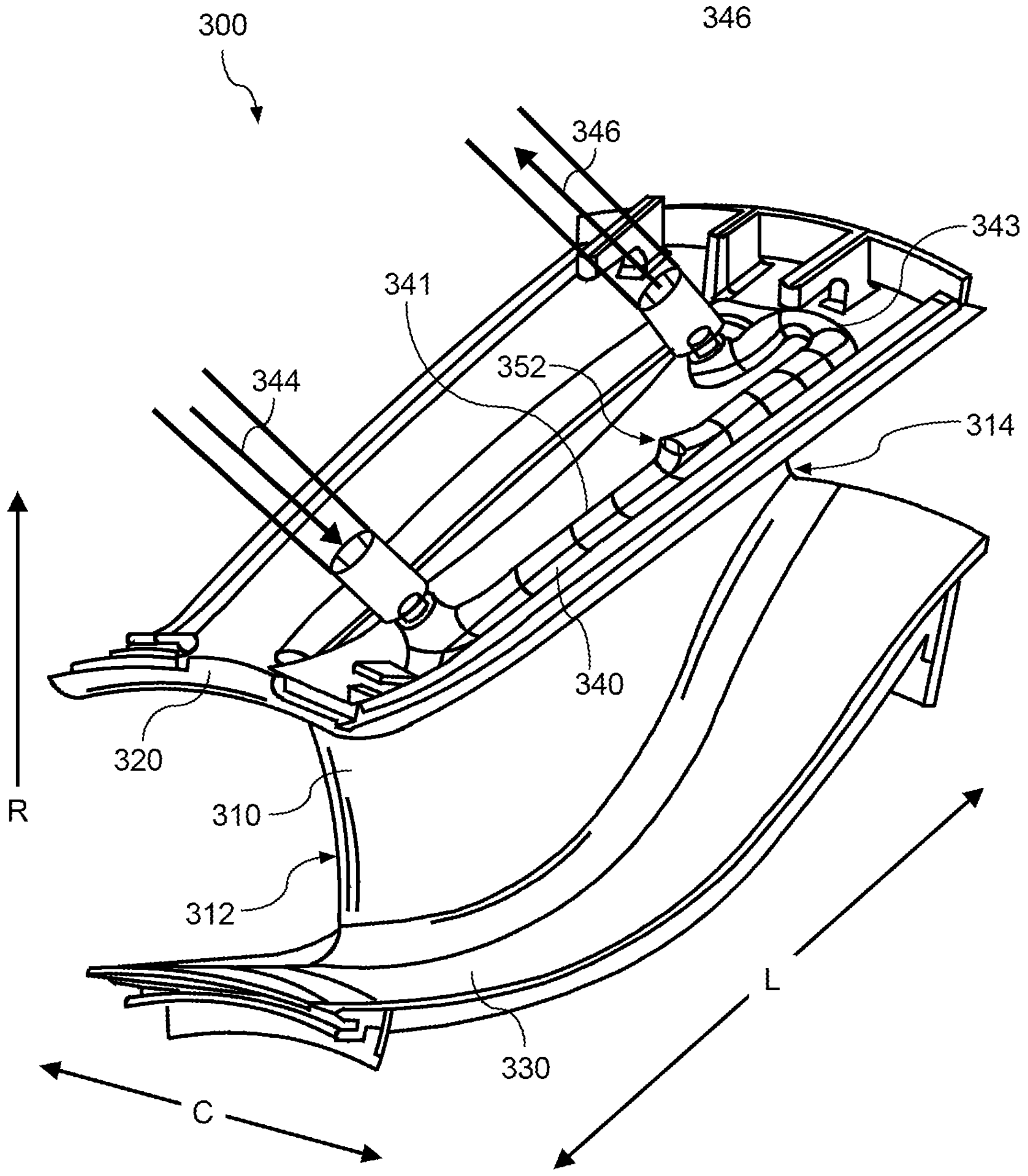
FIG. 5 is a perspective view of an embodiment of a portion of a static structure with a fluid circuit in accordance with aspects of the present disclosure.

Referring now to FIG. 3, FIG. 4, and FIG. 5, perspective views of exemplary embodiments of a portion of static structure 290 configured as a vane assembly 300 in accordance with aspects of the present disclosure are provided. One embodiment of the vane assembly 300 includes an airfoil 310 extended through a gas flowpath 302 of the engine 10. The vane assembly 300 may include a plurality of the airfoil 310 in circumferential arrangement. In a particular embodiment, the airfoil 310 includes a leading edge 312, a trailing edge 314, a pressure side 316, and a suction side 318 (depicted in FIGS. 12-13). However, in other embodiments, the airfoil 310 may be symmetrical, such that the pressure side 316 is a first side and the suction side 318 is a second side configured substantially similar to the first side. The vane assembly 300 includes an outer band 320 extended from the airfoil 310 and forming an outer radius surface or outer flowpath surface 322 of the gas flowpath 302. The vane assembly 300 may include an inner band 330 forming an inner radius surface or inner flowpath surface 332 of the gas flowpath 302. One or more of the leading edge 312, the trailing edge 314, the pressure side 316, the suction side 318, the outer flowpath surface 322, or the inner flowpath surface 332 may define a flowpath wall 304 at which a fluid circuit 340 is extended through the vane assembly 300. More specifically, as will be appreciated from the description hereinbelow, the fluid circuit 340 extends through the vane assembly 300 at a location in thermal communication with the flowpath wall.

Figure 6:
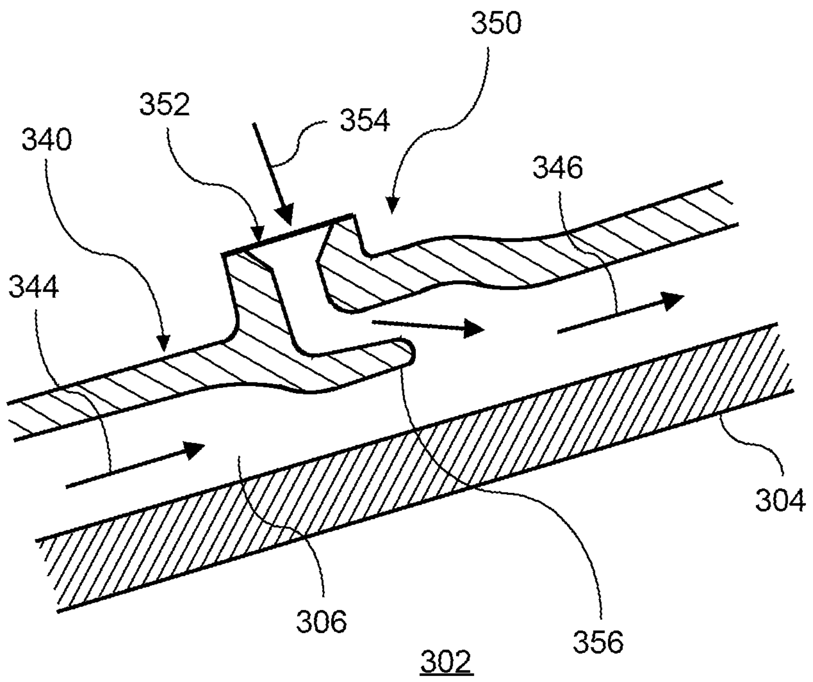
FIG. 6 is a cross-sectional view of an embodiment of an ejector at the fluid circuit in accordance with aspects of the present disclosure.
Figure 7:
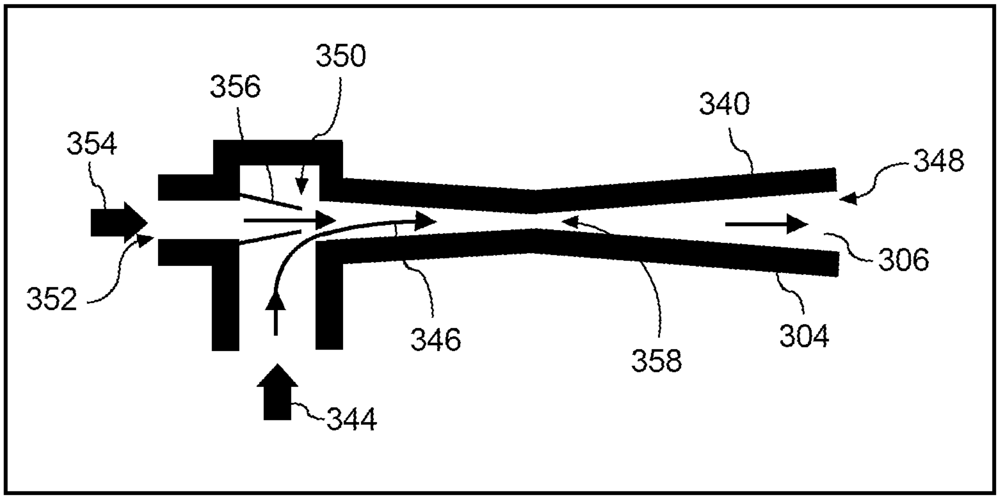
FIG. 7 is a cross-sectional view of an embodiment of an ejector at the fluid circuit in accordance with aspects of the present disclosure.

The fluid circuit 340 includes a first inlet opening 342 in fluid communication with a first cavity to receive a first flow of fluid, depicted schematically via arrows 344, through the fluid circuit 340. Referring briefly to FIGS. 6-7, cross-sectional views of a portion of the fluid circuit 340 are depicted in accordance with two exemplary embodiments of the present disclosure. The fluid circuit 340 includes an ejector 350 formed and positioned at the fluid circuit 340. Referring back to FIG. 3, the ejector 350 (FIGS. 6-7) includes a second inlet opening 352 in fluid communication with a fluid circuit flowpath 306 (FIGS. 6-7) through which the first flow of fluid 344 flows through the fluid circuit 340. The second inlet opening 352 is in fluid communication with a second cavity to receive a second flow of fluid, depicted schematically via arrows 354, into the fluid circuit flowpath 306 of the fluid circuit 340.

The embodiments provided with regard to FIGS. 3-5 are configured substantially similarly as one another as described above. In various embodiments, the fluid circuit 340 extends in a curved, tortuous, or serpentine circuit along the radial direction R, the circumferential direction C, and/or the longitudinal direction L. In FIGS. 3-5, the fluid circuit flowpath 306 is extended as a tortuous or serpentine flowpath through the vane assembly 300 at the outer band 320, such as along the circumferential direction C and/or longitudinal direction L. The embodiment in FIG. 4 further depicts the fluid circuit flowpath 306 extended as a tortuous or serpentine flowpath through an interior of the airfoil 310, such as along a span of the airfoil 310 along the radial direction R. However, it should be appreciated that embodiments depicting the fluid circuit 340 at the outer band 320 may be applied additionally, or alternatively, to the inner band 330.

Figure 12:
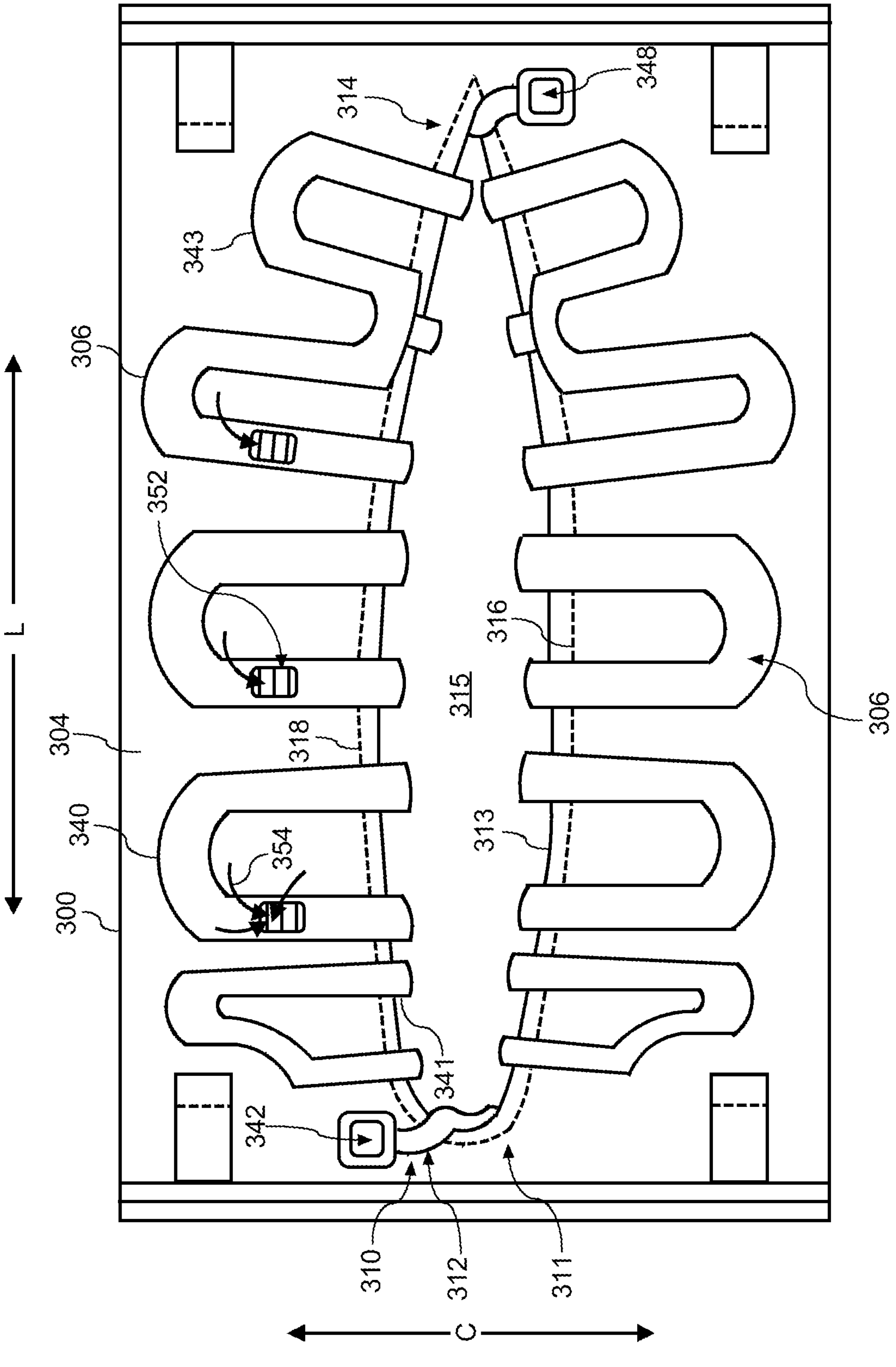
FIG. 12 is a view along a radial direction of an embodiment of the static structure with a fluid circuit in accordance with aspects of the present disclosure.
Figure 13:
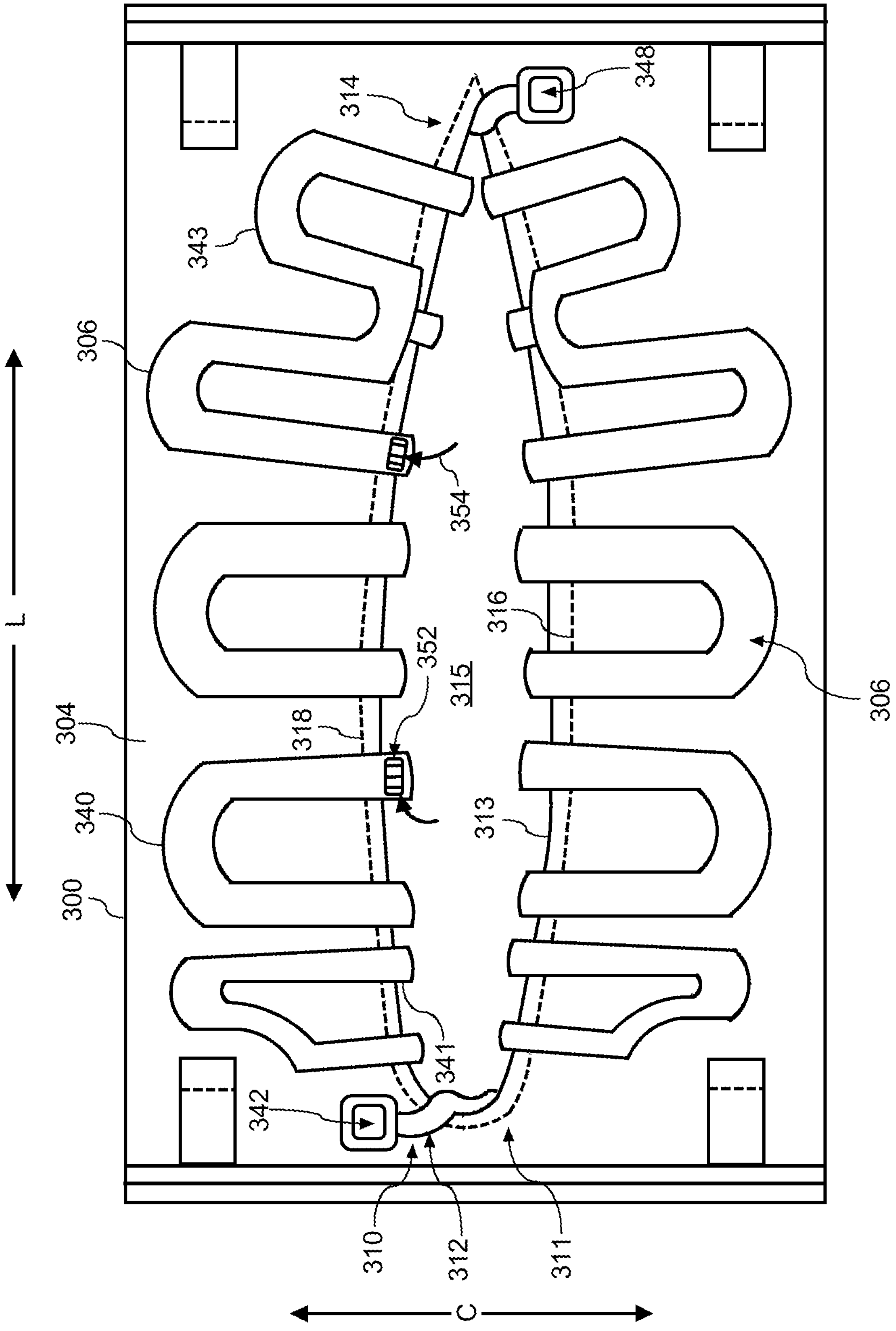
FIG. 13 is a view along a radial direction of an embodiment of the static structure with a fluid circuit in accordance with aspects of the present disclosure.

The tortuous or serpentine fluid circuit 340 includes a straight portion 341 extended along the longitudinal direction L (e.g., depicted in FIG. 5), or along the radial direction R (e.g., depicted in FIGS. 8-9), or along the circumferential direction C (e.g., depicted in FIGS. 12-13). The fluid circuit 340 further includes a curved portion 343 configured to turn the fluid flow. Together, the straight portion 341 and the curved portion 343 allow the flows within the fluid circuit 340 to enter into thermal communication across the area of the flowpath wall 304.

Embodiments of the vane assembly 300 such as depicted and described herein allows for the first flow of fluid 344, having a lower pressure and lower temperature from the first cavity relative to the second flow of fluid 354 from the second cavity, to provide cooling and thermal attenuation to the vane assembly 300. The ejector 350 entrains or pulls the lower-pressure first flow of fluid 344 into the fluid circuit 340 and though the fluid circuit flowpath 306 via the relatively high-pressure second flow of fluid 354 and the second inlet opening 352. The ejector 350 allows for large magnitudes of low-temperature first flow of fluid 344 to be pulled through the fluid circuit 340 by relatively small magnitudes of relatively high-temperature second flow of fluid 354. As such, embodiments provided herein allow for improved component and engine cooling, engine performance, combustion efficiency, and fuel consumption, and improved thermal efficiency, by reducing the magnitude of fluid, or high-pressure, high-temperature compressed air particularly, removed from the compressor section for cooling at other portions of the engine. Additionally, embodiments provided herein allow for utilizing relatively low-pressure fluid from a fan bypass stream, a third-stream bypass, an under-cowl cavity or under-casing cavity, or atmospheric condition, Referring now to FIGS. 6-7, the ejector 350 may include a nozzle 356 positioned downstream of the second inlet opening 352 relative to the second flow of fluid 354. The nozzle 356 is configured with a converging cross-sectional area relative to the second flow of fluid 354 from the second inlet opening 352 toward an outlet opening 348 (FIG. 3) of the fluid circuit 340. In certain embodiments, such as depicted in FIG. 7, the fluid circuit 340 forms a converging-diverging (CD) nozzle 358 positioned at the fluid circuit flowpath 306 downstream of the nozzle 356. The CD nozzle 358 is a portion of the fluid circuit flowpath 306 at which the flowpath is pinched or narrowed to provide a reduced cross-sectional area and then expanded from a throat of the CD nozzle 358. The CD nozzle 358 is configured to accelerate a third flow of fluid, depicted schematically via arrows 346, formed from a mixture of the first flow of fluid 344 with the second flow of fluid 354.

In a particular embodiment, the CD nozzle 358 depicted in FIG. 7 may be positioned in the straight portion 341 of the fluid circuit 340. The CD nozzle 358 positioned accordingly may allow for the mixed first and second flows of fluid (i.e., the third flow of fluid 346) to approach sonic flow conditions at the throat and then expand into supersonic flow conditions as the cross-sectional area of the fluid circuit flowpath 306 increases downstream of the CD nozzle 358. The CD nozzle 358 placed at the straight portion 341 of the fluid circuit 340 may allow for such increases in flow velocity before the flow approaches the curved portion 343, and any flow losses associated with bends, turns, or curves in the fluid circuit flowpath 306. Such an arrangement may mitigate stagnation of the flows of fluid, or particularly the relatively low-pressure first flow of fluid 344, through the fluid circuit 340.

Figure 8:
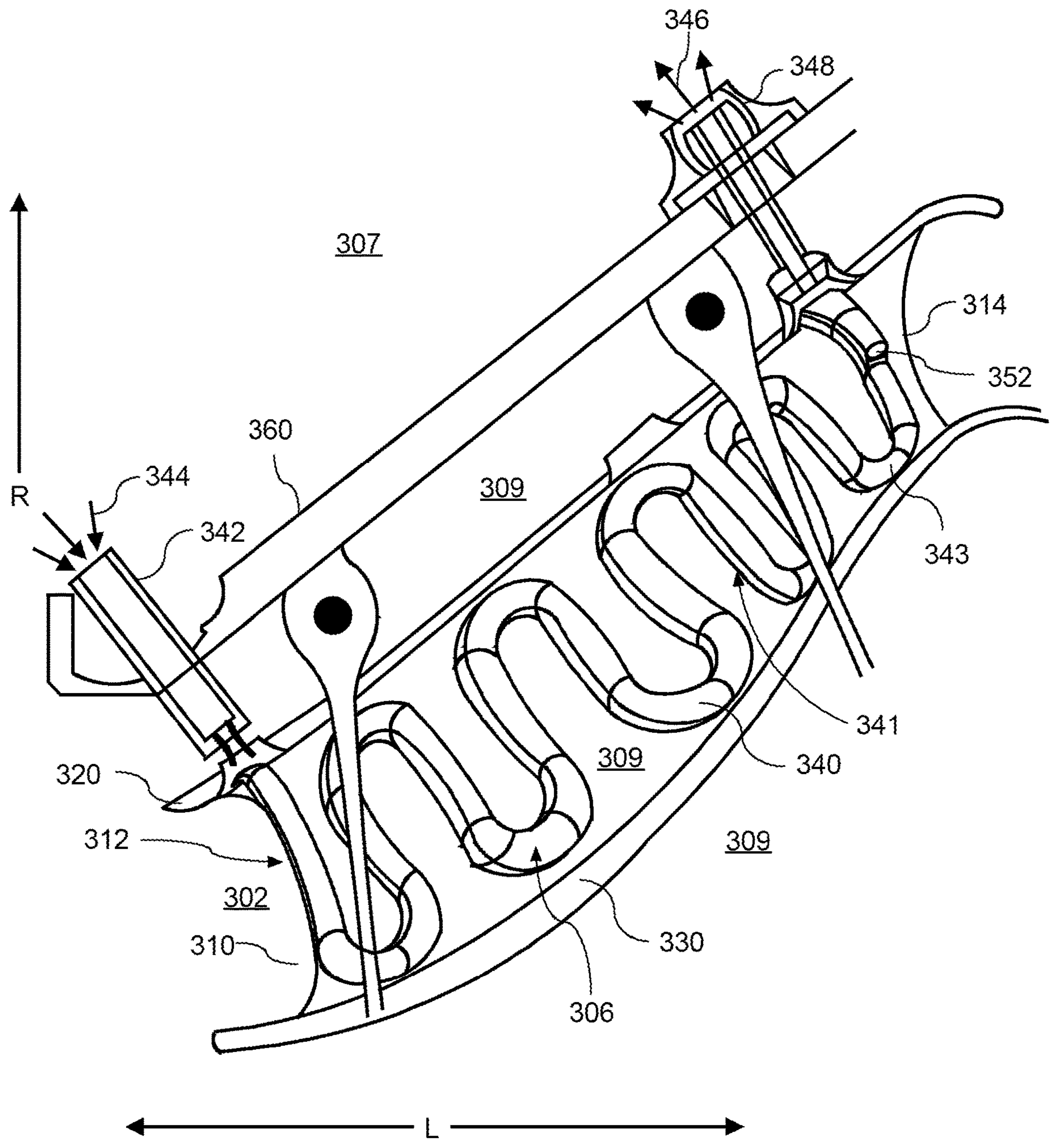
FIG. 8 is a cross-sectional view of an embodiment of the static structure with a fluid circuit in accordance with aspects of the present disclosure.
Figure 9:
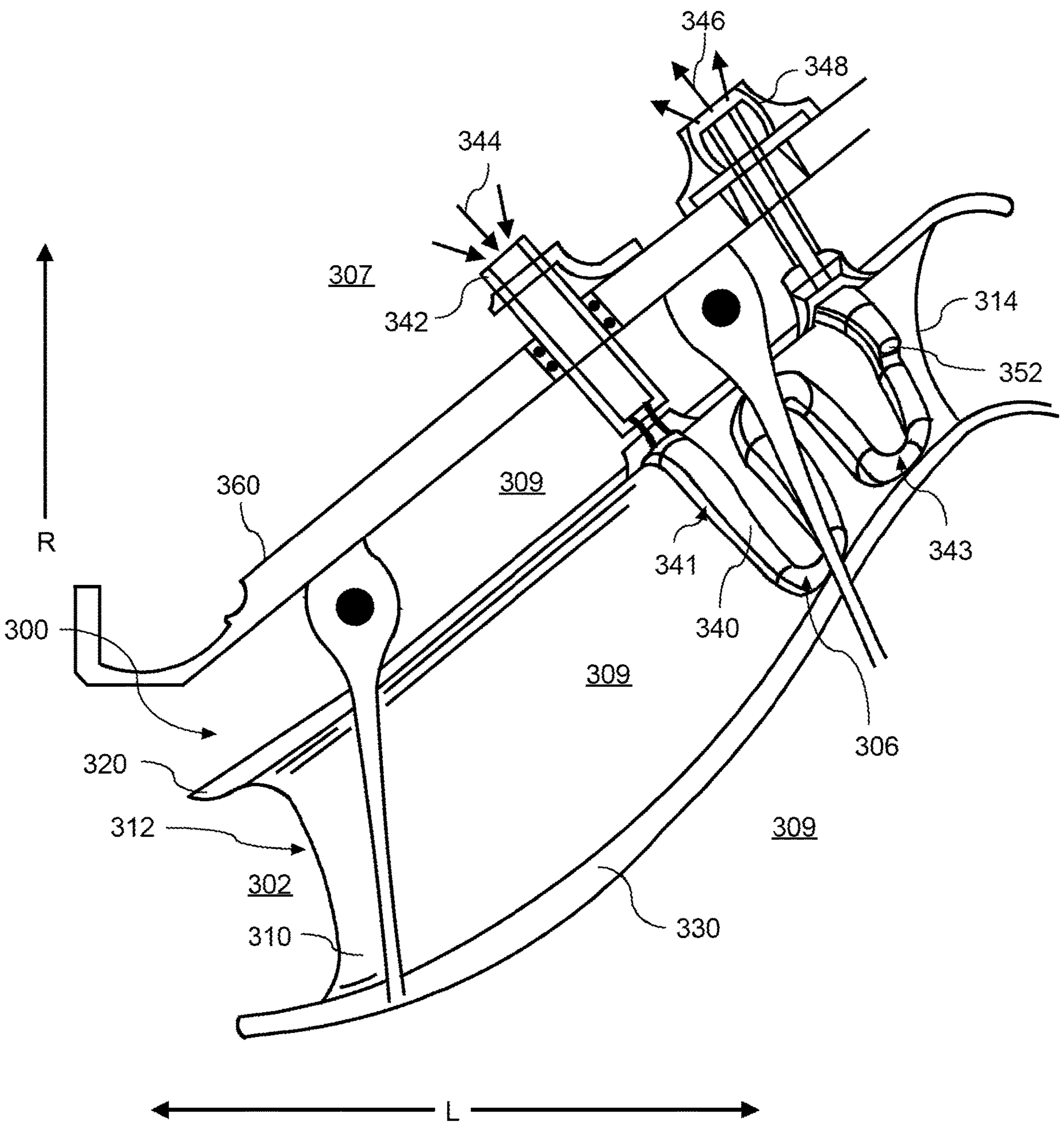
FIG. 9 is a cross-sectional view of an embodiment of the static structure with a fluid circuit in accordance with aspects of the present disclosure.

Referring now to FIGS. 8-9, embodiments of the vane assembly 300 are provided depicting exemplary cross-sectional views along the longitudinal direction L through an interior of embodiments of the airfoil 310 of the vane assembly 300. The embodiments provided with regard to FIGS. 8-9 depict the fluid circuit 340 extended tortuous through the airfoil 310 along the radial direction R and the longitudinal direction L. The embodiment depicted in FIG. 8 depicts a cross-sectional view along the longitudinal direction of the perspective view of the vane assembly 300 in FIG. 4, depicting the fluid circuit 340 extended tortuous from or proximate to the leading edge 312 of the airfoil 310 to, or proximate to, the trailing edge 314. It should be appreciated that "proximate to the leading edge 312" refers to within 20% of a chord of the airfoil 310 from the leading edge 312. It should be appreciated to "proximate to the trailing edge 314" refers to within 20% of the chord of the airfoil 310 from the trailing edge 314.

Referring to embodiment depicted in FIG. 9, the fluid circuit 340 extends through the interior of the airfoil 310 from a position along the longitudinal direction L between the leading edge 312 and the trailing edge 314. It should be appreciated that the fluid circuit 340 may be configured to extend tortuous through the airfoil 310 from any portion of the airfoil 310 based on a thermal communication at the airfoil 310. In various embodiments, the fluid circuit 340 is extended to particular portions of the airfoil 310 based at least on a desired thermal attenuation or thermal gradient reduction at the airfoil 310.

Figure 10:
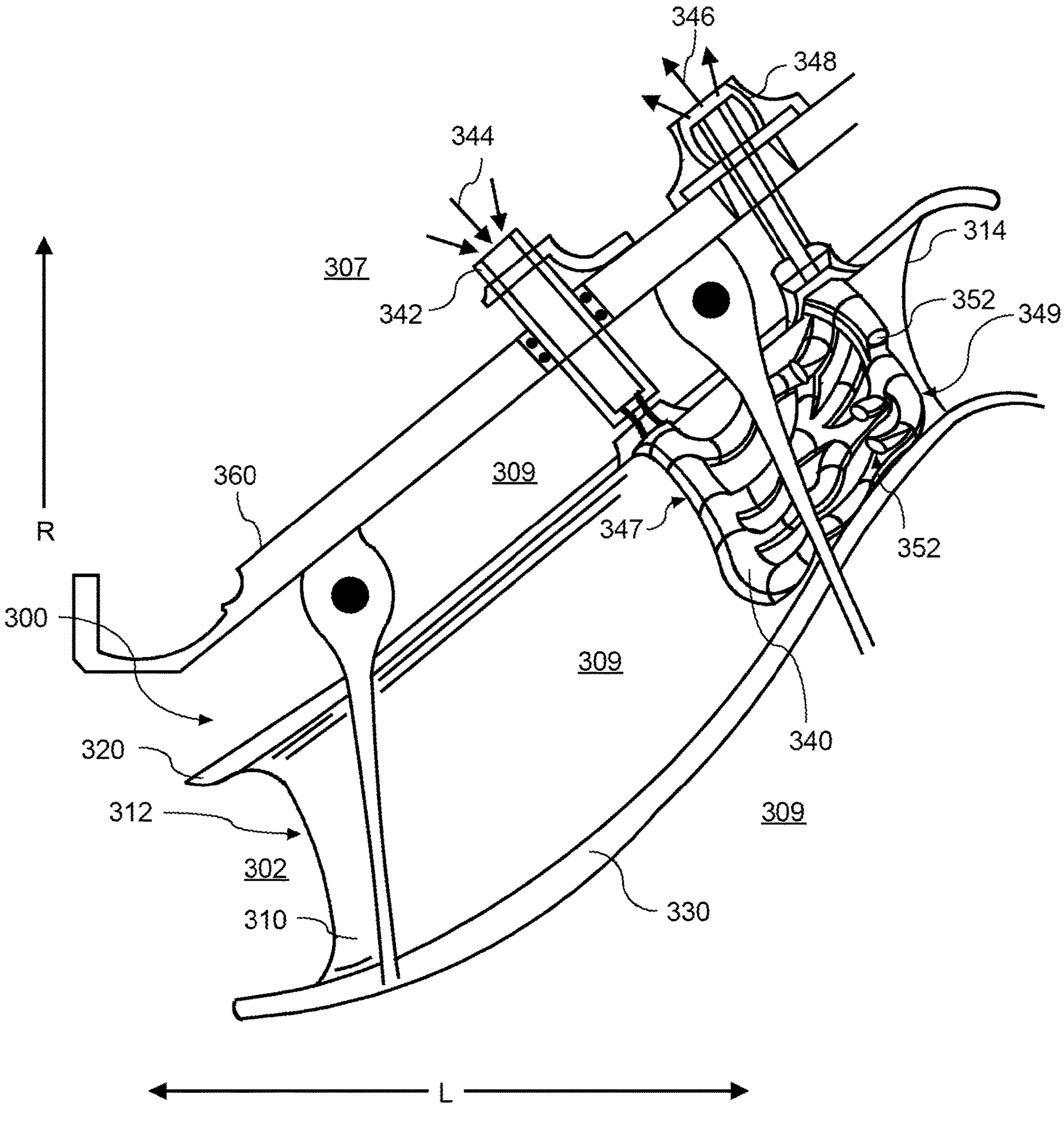
FIG. 10 is a cross-sectional view of an embodiment of the static structure with a fluid circuit in accordance with aspects of the present disclosure.
Figure 11:
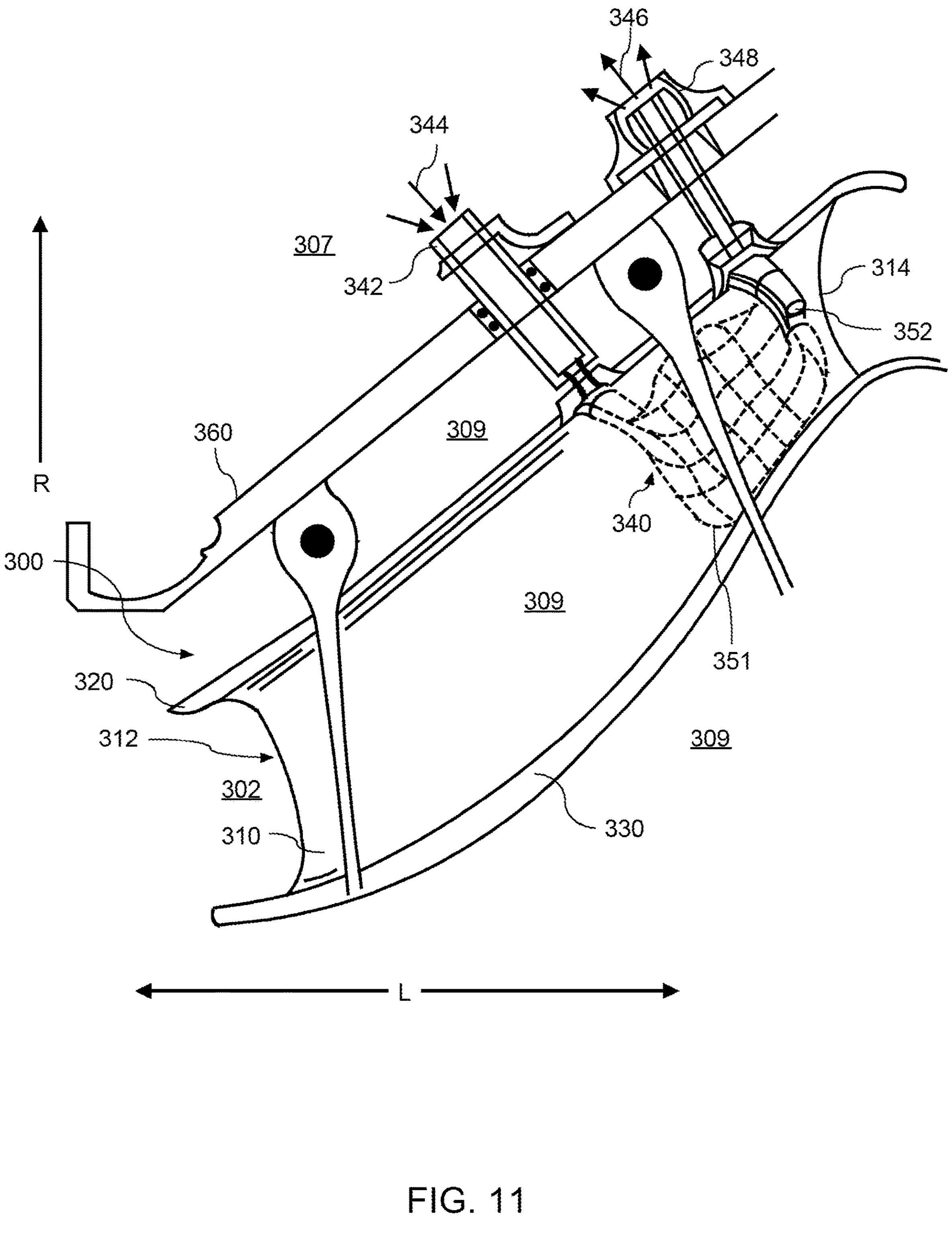
FIG. 11 is a cross-sectional view of an embodiment of the static structure with a fluid circuit in accordance with aspects of the present disclosure.

Referring now to FIGS. 10-11, exemplary embodiments are provided substantially in accordance with the descriptions provided with regard to FIGS. 3-9. In FIGS. 10-11, the fluid circuit 340 is configured as a grid or lattice structure. Referring to FIG. 10, the fluid circuit 340 forming the grid or lattice structure may include a plurality of branches 345 extended from a first base portion 347 to a second base portion 349. In certain embodiments, the first base portion 347 may extend from an upstream end of the fluid circuit 340 or the first inlet opening 342. The second base portion 349 may extend from a downstream end of the fluid circuit 340 or the outlet opening 348. The second inlet opening 352 may be positioned at one or more of the branches 345 between the first base portion 347 and the second base portion 349. In certain embodiments, the straight portion 341 depicted and described in FIGS. 3-9 may form and include the base portions 347, 349 depicted and described with regard to FIG. 10.

Referring to FIG. 11, the fluid circuit 340 forming the grid or lattice structure includes a reference flowpath centerline 351. The surrounding walls of the fluid circuit 340 depicted in FIG. 10 are omitted for clarity. In FIG. 11, the fluid circuit 340 may include the plurality of branches 345 and/or the base portions 347, 349 having small diameter channels. The small diameter channels may be formed via an additive manufacturing process and allow for the grid or lattice structure to be formed at a portion of the airfoil 310, or throughout the span or chord of the airfoil 310. As provided herein, the fluid circuit 340 may be formed at particular portions of the static structure 290, such as the airfoil 310, based at least in part on a desired thermal communication or thermal attenuation at the component or surrounding flow-path.

The fluid circuit 340 depicted in FIGS. 10-11 including the tortuous flowpath depicted in FIGS. 3-4 and FIGS. 8-9 or the grid structure depicted in FIGS. 10-11 may include sizes, diameters, or quantities of turns, intersections, branches, or other geometries to allow for desired cooling effectiveness or thermal communication with regard to the area of the engine 10 at which the fluid circuit 340 is extended and the thermal loads, flow rates, or pressures experienced during operation. The fluid circuit 340 may form a tortuous or serpentine flowpath, a grid, lattice, crisscross, network, or other appropriate pattern, or combinations thereof, connecting the neighboring channels across or with channels touching each other. As further described herein with regard to FIGS. 12-14, the fluid circuit 340 may extend within the surfaces, through the surface, or protruding into one or more flowpaths as desired based on desire thermal communication and/or flow characteristics of a surrounding fluid.

Referring back to FIGS. 8-9 exemplary embodiments are provided of a first cavity 307, from which the first flow of fluid 344 is drawn through the first inlet opening 342 and a second cavity 309, from which a second flow of fluid 354 is drawn through the second inlet opening 352. In some embodiments, the first cavity 307 is separated from the second cavity 309 by a core casing 360 surrounding the vane assembly 300. The core casing 360 may be positioning outward along the radial direction R of the outer band 320 and extend along the longitudinal direction L and the circumferential direction C. The second cavity 309 is separated from the first cavity 307 such as to allow for different pressures and/or temperatures of fluid at the respective cavities. The outer band 320 further separates the second cavity 309 from the gas flowpath 302. In other embodiments, the second cavity 309 is formed inward along the radial direction R and separate from the gas flowpath 302 and separated by the inner band 330.

Referring now to FIGS. 12-13, exemplary views of embodiments of the vane assembly 300 along the radial direction R are provided. The embodiments provided with regard to FIGS. 3-5 may be configured as depicted in the embodiments provided with regard to FIGS. 12-13. In various embodiments, the fluid circuit 340 extends from the outer band 320 and/or the inner band 330 and into the airfoil 310. The airfoil 310 may include an airfoil flowpath surface 311 in fluid communication with the gas flowpath 302. The airfoil flowpath surface 311 is formed at the pressure side 316 and the suction side 318 of the airfoil 310. The airfoil 310 may further include an inner airfoil surface 313 inward of the airfoil flowpath surface 311. The airfoil flowpath surface 311 and the inner airfoil surface 313 may together form a double-wall structure at the airfoil 310. In still certain embodiments, the airfoil 310 may include a hollow airfoil cavity 315 inward of the inner airfoil surface 313.

The embodiments provided with regard to FIGS. 3-11 may be configured such as depicted and described with regard to one or both of the embodiments depicted and described with regard to FIGS. 12-13. The fluid circuit 340 depicted in FIGS. 3-11 may extend through the airfoil 310 within the double-wall structure between the airfoil flowpath surface 311 and the inner airfoil surface 313. In a particular embodiment depicted in FIG. 11, the second inlet opening 352 into the fluid circuit 340 is in fluid communication with the airfoil cavity 315 defining the relatively high-pressure second cavity. In such an embodiment, the second flow of fluid 354 is extracted from the airfoil cavity 315 to entrain the first flow of fluid 344 through the fluid circuit flowpath 306.

It should be appreciated that other embodiments of the airfoil 310 may include solid or substantially-solid volumes without the hollow airfoil cavity 315 depicted in FIGS. 12-13. In certain embodiments, the airfoil flowpath surface 311 is in fluid communication with the gas flowpath 302 while the inner airfoil surface 313 may represent a reference thermal gradient into the airfoil 310 at which cooling, thermal attenuation, or thermal gradient reduction may be applied via the fluid circuit 340 described herein. It should further be appreciated that embodiments depicted and described herein may allow for improved aerodynamic performance of airfoils, such as by allowing for reduced airfoil thicknesses, reduced cross-sectional areas relative to the gas flowpath, or other changes in dimension that allow for increased or decreased airfoil dimensions versus known vane assemblies.

Figure 14:
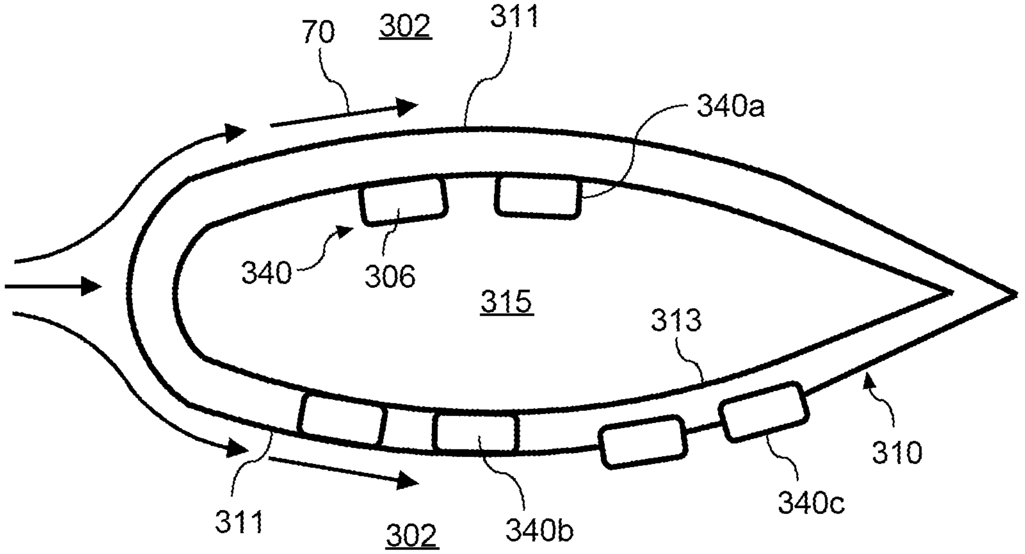
FIG. 14 is a cross-sectional view depicting embodiments of the fluid circuit relative to one or more surfaces of the static structure in accordance with aspects of the present disclosure.

Referring now to FIG. 14, a view along the radial direction R through an exemplary embodiment of the airfoil 310 is provided. The embodiment depicted in FIG. 14 is configured as described in the various embodiments of FIGS. 3-13. FIG. 14 depicts exemplary locations through the airfoil 310 at which the fluid circuit 340 may extend. In one embodiment, the fluid circuit 340 may extend within the airfoil cavity 315, such as depicted at fluid circuit 340*a*. The fluid circuit 340*a* may attach to the inner airfoil surface 313, allowing the fluid circuit flowpath 306 to be formed at least in part by the walls of the fluid circuit 340 and the inner airfoil surface 313. The fluid circuit 340*a* may allow for thermal communication at the airfoil 310 such as described below for fluid circuit 340*b*. Additionally, or alternatively, the fluid circuit 340*a* may be formed at the airfoil cavity 315 and attached to the inner airfoil surface 313, or the inside of the airfoil 310 at the airfoil flowpath surface 311 (not depicted) without the inner airfoil surface 313. The fluid circuit 340*a* may allow for thermal communication at the airfoil 310, and additionally may allow for thermal communication with a fluid within the airfoil cavity 315 (e.g., air, lubricant, hydraulic fluid, fuel, etc.).

In another embodiment, the fluid circuit 340 may extend within the double-wall structure of the airfoil 310 between the inner airfoil surface 313 and the airfoil flowpath surface 311, such as depicted at fluid circuit 340*b*. In still another embodiment, the fluid circuit 340 may at least partially protrude into the gas flowpath 302, such as depicted at fluid circuit 340*c*. The fluid circuit 340*c* may form ripples, ridges, waves, or other surface features protruding into the gas flowpath 302, in contrast to the fluid circuit 340*b* formed inward of the airfoil flowpath surface 311 into the airfoil 310. The fluid circuit 340*c* may accordingly allow for greater thermal communication with the gas flowpath 302. Additionally, or alternatively, the fluid circuit 340*c* may generate certain flow characteristics for the flow of combustion gases 70 passing across the airfoil 310. Such flow characteristics may include turbulence, vortices, whirling, flow separation from the airfoil flowpath surface 311, or other characteristics that may increase diffusivity, rotationality, dissipation, or irregularity. In contrast, the fluid circuit 340*b* may allow for thermal communication at the airfoil flowpath surface 311 and/or inner airfoil surface 313 while allowing for laminar flows of fluid (e.g., the combustion gases 70) across the airfoil 310.

Referring back to FIGS. 1-2, in particular embodiments, the static structure 290 including the vane assembly 300 described herein is positioned between the fan section 14 and the LP compressor 40 (FIG. 1), or between the LP compressor 40 and the HP compressor 42 (FIG. 1), or at an exit of the HP compressor 42 at the inlet guide vane 122 of the combustion section 34 (FIG. 2), or at an exit of the combustion section 34 at the turbine nozzle 52 at an inlet of the turbine section 36 (FIG. 2), or between the LP turbine 50 and the HP turbine 48 (FIG. 1), or downstream of the HP turbine 48 at the exhaust section 38 (FIG. 1).

Embodiments of the static structure 290 and vane assembly 300 provided herein may be formed as a turbine center frame, turbine vane frame, or turbine rear frame positioned at or within the turbine section 36, between the combustion section 34 and the turbine section 36, or between the turbine section 36 and the exhaust section 38. Other embodiments may be formed as a compressor intermediate frame, a fan intermediate frame, or a diffuser or pre-diffuser vane positioned at or within the compressor section 32, or between the compressor section 32 and the combustion section 34, or between the fan section 14 and the compressor section 32.

In still various embodiments, the first cavity 307 may be formed at or within the nacelle 20. The nacelle 20 may form an under-cowl cavity or plenum. As provided above, the first cavity 307 is a low-pressure region with a large flow of fluid, such as air, relative the second cavity 309. The first cavity 307 may accept a flow of air from atmospheric condition, or from downstream of the fan section 14. In certain embodiments, the first cavity 307 is formed by the bypass airflow passage 30. The struts 26 may be configured with one or more flowpath conduits to route the first flow of fluid to the vane assembly 300 such as described herein. In still another embodiment, the first cavity 307 is formed within the outer casing 28, such as described with regard to the nacelle 20. In various embodiments, the nacelle 20 or the outer casing 28, or other appropriate portion of the engine 10, may each include a first casing defining the first cavity 307.

Referring to FIG. 2, in one embodiment, the second cavity 309 may be formed within the compressor discharge casing 118 at the compressor discharge plenum 120. In another embodiment, the second cavity 309 may be formed at the turbine section 36 inward or outward of the gas flowpath through which the combustion gases 70 flow. As provided above, the second cavity 309 is a high-pressure region relative to the first cavity 307. The high-pressure region is formed, at least in part, by unburned compressed air from the compressor section 32. The compressed air may be siphoned or bled from the compressor section 32 or extracted from the compressor discharge plenum 120. Having been received from the compressor section 32, the compressed air providing the second flow of fluid 354 at the second cavity 309 may generally have a pressure and temperature corresponding to the compressed air at one or more stages of the compressor section 32. In contrast, the first flow of fluid 344 the first cavity 307 may generally have a pressure and temperature corresponding to an outside ambient or atmospheric condition around the engine 10, or corresponding to the flow of air from the fan section 14, or corresponding to a flow of air from one or more stages at the compressor section 32 upstream of the one or more stages from which the second flow of fluid 354 is received from the second cavity 309. In certain embodiments, the first flow of fluid 344 may be received from the LP compressor 40 while the second flow of fluid 354 is received from the HP compressor 42 or combustion section 34. In various embodiments, the core casing 360, the compressor discharge casing 118, or other appropriate portion of the engine 10 may include a second casing forming the second cavity 309.

In an exemplary embodiment of the engine 10, during operation at a rated power output (i.e., a maximum steady-state operating condition, or a maximum steady-state operating condition at which safe or stable operation of the engine may be performed, such as a takeoff condition or full-load condition) the first flow of fluid 344 may have a first pressure between 9 pounds per square inch ("psi") and 14.8 psi. The second flow of fluid 354 may have a second pressure of at least 20 psi. In some embodiments, the second flow of fluid 354 may have the second pressure of up to 250 psi. In various embodiments, the first flow of fluid 344 and the second flow of fluid 354 may include a temperature differential between 100 degrees Fahrenheit and 400 degrees Fahrenheit. However, it should be appreciated that the second pressure may be limited by maximum pressure outputs at the compressor section 32. As such, embodiments of the engine 10 and the vane assembly 300 may allow for the second pressure to be greater than 250 psi. During operation of the engine 10, the second flow of fluid 354 may entrain or pull the first flow of fluid 344 through fluid circuit 340 via the ejector 350 and the pressure differential between the flows of fluid. The third flow of fluid 346 (i.e., the mixed flows of first and second flows of fluid 344, 354) egresses through the outlet opening 348. In certain embodiments, the outlet opening 348 purges the third flow of fluid 346 into one or more embodiments of the first cavity 307 such as described herein.

Embodiments provided herein allow for a cooled fairing, vane assembly, or nozzle fed by a flow received from the first cavity and purged from the fluid circuit to the first cavity. Embodiments provided herein allow for forming vane assemblies, frames, or casings at positions such as described herein with relatively lower-grade, lower cost, or easier to manufacture materials as a result of the improved cooling primarily from the first flow of fluid from the first cavity being much cooler than relatively hotter air from the compressor section. Additionally, or alternatively, embodiments provided herein may utilize known, higher-grade materials and allow for increased gas flowpath temperatures and increased combustion gas exit temperatures. Still further, one or more such benefits may be obtained without the need for increased magnitudes of compressed air from the compressor section. Furthermore, one or more such benefits may be obtained while further reducing a magnitude of compressed air from the compressor section.

All or part of the static structure 290 and/or the vane assembly 300, the fluid circuit 240, and the ejector 350 may be formed via one or more additive manufacturing or 3D printing processes. The vane assembly 300 may be formed as a single, unitary, integral, or monolithic structure with the fluid circuit 240 and the ejector 350 described herein. In other embodiments, the static structure 290, the vane assembly 300, or portions thereof may be formed as separate or separatable pieces attached together via one or more bonding processes, such as welding, brazing, or using mechanical fasteners (e.g., nuts, bolts, screws, tie-rods, etc.). In still other embodiments, structures provided herein may be formed from forgings, machined materials, castings, or other appropriate manufacturing processes. It should be appreciated that additive manufacturing may particularly allow for the formation of the fluid circuit 340, the ejector 350, and other openings, conduits, flowpaths, tortuous circuits, grid structures, lattice structures, double-wall structures, or particular positionings within the double-wall structure, the outer band, the inner band, or the airfoil.

In various embodiments, the first inlet opening 342, the second inlet opening 352, and the outlet opening 348 are sealed to a respective wall at the first cavity 307 and the second cavity 309 to allow for a desired pressure differential and to accommodate relative thermal and mechanical deflections of engine 10, or the walls forming embodiments of the first cavity 307 and the second cavity 309 described herein. Generally, the first cavity 307 and the second cavity 309 are separated or sealed from one another, such as to allow for the pressure and/or temperature differences between the first flow of fluid 344 and the second flow of fluid 354 for operation of the ejector 350. Methods may include forming the first inlet opening 342 and the second inlet opening 352 as integral structures to the respective cavities 307, 309, such as via an additive manufacturing method, casting, forging, or other appropriate manufacturing process. Other methods may include bonding, welding, forming, fastening, or otherwise adhering a fitting to a respective wall of the first cavity 307 and/or the second cavity 309, such as to form the respective first inlet opening 342, the second inlet opening 352, or the outlet opening 348. Still other appropriate methods for forming the openings described herein to allow for pressure differentials and structural deflection may be utilized in accordance with one skilled in the art.

Examples of powder-based additive layer manufacturing include but are not limited to selective laser sintering (SLS), selective laser melting (SLM), direct metal laser sintering (DMLS), direct metal laser melting (DMLM) and electron beam melting (EBM) processes. Representative examples of suitable powder materials for embodiments of the apparatus depicted and described herein may include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX"). However, as provided above, embodiments of engines including the fluid circuit and ejector such as described herein may allow for utilizing materials with less strength at elevated temperatures of operation in a gas turbine engine, such as due to the improved cooling from the low-pressure, low temperature air from the first cavity, and/or through the double-wall structures provided herein.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

1. A gas turbine engine, the engine comprising a vane assembly comprising a flowpath wall, wherein a fluid circuit is extended through the flowpath wall, and wherein the fluid circuit defines a first inlet opening in fluid communication with a first cavity to receive a first flow of fluid through the fluid circuit, and wherein the vane assembly comprises an ejector positioned at the fluid circuit, wherein the ejector defines a second inlet opening in fluid communication with a second cavity to receive a second flow of fluid through the ejector and into the fluid circuit.

2. The gas turbine engine of any one or more clauses herein, wherein the second inlet opening is positioned downstream along the fluid circuit of the first inlet opening.

3. The gas turbine engine of any one or more clauses herein, wherein the ejector comprises a nozzle positioned downstream of the second inlet opening relative to the second flow of fluid into the fluid circuit.

4. The gas turbine engine of any one or more clauses herein, wherein the nozzle comprises a converging cross-sectional area relative to the second flow of fluid from the second inlet opening toward an outlet opening of the fluid circuit.

5. The gas turbine engine of any one or more clauses herein, wherein the fluid circuit forms a converging-diverging nozzle positioned at the fluid circuit downstream of the nozzle.

6. The gas turbine engine of any one or more clauses herein, wherein the fluid circuit forms a tortuous flowpath, a grid structure, or a lattice structure through the vane assembly.

7. The gas turbine engine of any one or more clauses herein, wherein the fluid circuit comprises a straight portion extended along a longitudinal direction, a radial direction, or a circumferential direction, and wherein the fluid circuit comprises a curved portion configured to turn the first flow of fluid.

8. The gas turbine engine of any one or more clauses herein, wherein the vane assembly comprises an airfoil, wherein the flowpath wall is an airfoil flowpath surface, and wherein the airfoil comprises a double-wall structure through which the fluid circuit is extended.

9. The gas turbine engine of any one or more clauses herein, wherein the double-wall structure comprises the airfoil flowpath surface formed at a pressure side and a suction side of the airfoil, and wherein the double-wall structure comprises an inner airfoil surface inward of the airfoil flowpath surface, and wherein the fluid circuit is extended between the airfoil flowpath surface and the inner airfoil surface.

10. The gas turbine engine of any one or more clauses herein, wherein the airfoil forms an airfoil cavity inward of the inner airfoil surface, wherein the second cavity is the airfoil cavity, and wherein the second inlet opening is in fluid communication with the airfoil cavity to receive the second flow of fluid therefrom into the fluid circuit.

11. The gas turbine engine of any one or more clauses herein, wherein the airfoil comprises a leading edge and a trailing edge, and wherein the fluid circuit is extended from proximate to the leading edge to proximate to the trailing edge.

12. The gas turbine engine of any one or more clauses herein, wherein the first inlet opening is proximate to the leading edge relative to the trailing edge.

13. The gas turbine engine of any one or more clauses herein, the engine comprising a nacelle forming the first cavity; and a core casing forming the second cavity, wherein the vane assembly is configured to receive the first flow of fluid from the first cavity having a low pressure relative to the second flow of fluid from the second cavity.

14. The gas turbine engine of any one or more clauses herein, the engine comprising a compressor section, a combustion section, and a turbine section in serial flow order, wherein the vane assembly is positioned at one or more of the compressor section, the combustion section, or the turbine section.

15. The gas turbine engine of any one or more clauses herein, wherein the flowpath wall, the fluid circuit, and the ejector are formed as an integral, unitary structure.

16. The gas turbine engine of any one or more clauses herein, wherein the vane assembly comprises an outer band, and wherein the fluid circuit extends along the outer band of the flowpath wall.

17. The gas turbine engine of any one or more clauses herein, wherein the outer band at least partially forms a gas flowpath of the engine through which combustion gases flow.

18. The gas turbine engine of any one or more clauses herein, wherein the vane assembly comprises an inner band, and wherein the fluid circuit extends through the inner band of the flowpath wall.

19. A static structure for a gas turbine engine, the static structure comprising a flowpath wall, wherein a fluid circuit is extended through the flowpath wall, and wherein the fluid circuit comprises a first inlet opening in fluid communication with a first cavity to receive a first flow of fluid through the fluid circuit, and wherein the static structure comprises an ejector positioned at the fluid circuit, wherein the ejector comprises a second inlet opening in fluid communication with a second cavity to receive a second flow of fluid through the ejector and into the fluid circuit.

20. The static structure of any one or more clauses herein, wherein the static structure comprises a double-wall structure through which the fluid circuit is extended.

21. A gas turbine engine comprising the static structure of any one or more clauses herein.

What is claimed is:

1. A gas turbine engine, the engine comprising:

a vane assembly comprising a flowpath wall, wherein a fluid circuit is extended through the flowpath wall, and wherein the fluid circuit defines a first inlet opening in fluid communication with a first cavity to receive a first flow of fluid through the fluid circuit, and wherein the vane assembly comprises an ejector positioned at the fluid circuit, wherein the ejector defines a second inlet opening in fluid communication with a second cavity to receive a second flow of fluid through the ejector and into the fluid circuit, the second cavity being fluidly separated from the first cavity, the second flow of fluid having a higher pressure and a higher temperature than the first flow of fluid, wherein the ejector comprises a nozzle positioned downstream of the second inlet opening relative to the second flow of fluid toward the fluid circuit, and wherein the nozzle is configured to urge the first fluid flow through the fluid circuit by ejecting the second flow of fluid from the second inlet opening through the nozzle into the fluid circuit.

2. The gas turbine engine of claim 1, wherein the second inlet opening is positioned downstream along the fluid circuit of the first inlet opening.

3. The gas turbine engine of claim 1, wherein the nozzle comprises a converging cross-sectional area relative to the second flow of fluid from the second inlet opening toward an outlet opening of the fluid circuit.

4. The gas turbine engine of claim 1, wherein the fluid circuit forms a converging-diverging nozzle positioned at the fluid circuit downstream of the nozzle.

5. The gas turbine engine of claim 1, wherein the fluid circuit forms a tortuous flowpath, a grid structure, or a lattice structure through the vane assembly.

6. The gas turbine engine of claim 5, wherein the fluid circuit comprises a straight portion extended along a longitudinal direction, a radial direction, or a circumferential direction, and wherein the fluid circuit comprises a curved portion configured to turn the first flow of fluid.

7. The gas turbine engine of claim 1, wherein the vane assembly comprises an airfoil, wherein the flowpath wall is an airfoil flowpath surface, and wherein the airfoil comprises a double-wall structure through which the fluid circuit is extended.

8. The gas turbine engine of claim 7, wherein the double-wall structure comprises the airfoil flowpath surface formed at a pressure side and a suction side of the airfoil, and wherein the double-wall structure comprises an inner airfoil surface inward of the airfoil flowpath surface, and wherein the fluid circuit is extended between the airfoil flowpath surface and the inner airfoil surface.

9. The gas turbine engine of claim 8, wherein the airfoil forms an airfoil cavity inward of the inner airfoil surface, wherein the second cavity is the airfoil cavity, and wherein the second inlet opening is in fluid communication with the airfoil cavity to receive the second flow of fluid therefrom into the fluid circuit.

10. The gas turbine engine of claim 7, wherein the airfoil comprises a leading edge and a trailing edge, and wherein the fluid circuit is extended from proximate to the leading edge to proximate to the trailing edge.

11. The gas turbine engine of claim 10, wherein the first inlet opening is proximate to the leading edge relative to the trailing edge.

12. The gas turbine engine of claim 1, the engine comprising:

a compressor section, a combustion section, and a turbine section in serial flow order, wherein the vane assembly is positioned at one or more of the compressor section, the combustion section, or the turbine section.

13. The gas turbine engine of claim 1, wherein the vane assembly comprises an outer band, and wherein the fluid circuit extends along the outer band.

14. The gas turbine engine of claim 13, wherein the outer band at least partially forms a gas flowpath of the engine through which combustion gases flow.

15. The gas turbine engine of claim 1, wherein the vane assembly comprises an inner band, and wherein the fluid circuit extends through the inner band.

16. The gas turbine engine of claim 1, wherein the fluid circuit further comprises an outlet cavity opening in fluid communication with an outlet cavity, wherein the outlet cavity is fluidly separate from a gas flowpath through the gas turbine engine.

17. A static structure for a gas turbine engine, the static structure comprising:

a flowpath wall, wherein a fluid circuit is extended through the flowpath wall, and wherein the fluid circuit comprises a first inlet opening in fluid communication with a first cavity to receive a first flow of fluid through the fluid circuit, and wherein the static structure comprises an ejector positioned at the fluid circuit, wherein the ejector comprises a second inlet opening in fluid communication with a second cavity to receive a second flow of fluid through the ejector and into the fluid circuit, the second cavity being fluidly separated from the first cavity, the second flow of fluid having a higher pressure and a higher temperature than the first flow of fluid, wherein the ejector comprises a nozzle configured to urge the first flow of fluid through the fluid circuit by ejecting the second flow of fluid from the second inlet opening through the nozzle into the fluid circuit, and wherein the fluid circuit further comprises an outlet opening downstream of the ejector, wherein the outlet opening is in fluid communication with an outlet cavity, wherein the outlet cavity is fluidly separate from a gas flowpath through the gas turbine engine.

18. The static structure of claim 17, wherein the static structure comprises a double-wall structure through which the fluid circuit is extended.

19. The static structure of claim 17, wherein the nozzle is positioned downstream of the second inlet opening relative to the second flow of fluid into the fluid circuit.

20. The static structure of claim 17, wherein the outlet cavity is within a nacelle, within a bypass airflow passage, or within an outer casing.

* * * * *